United States Patent [19]
Dunn

[11] 4,389,803
[45] Jun. 28, 1983

[54] SLIDE VIEWER OR PROJECTOR

[75] Inventor: Sidney R. Dunn, Eastbourne, England

[73] Assignee: Photax (London) Ltd., Eastbourne, England

[21] Appl. No.: 300,475

[22] Filed: Sep. 9, 1981

[30] Foreign Application Priority Data

Sep. 11, 1980 [GB] United Kingdom ................. 8029425

[51] Int. Cl.³ ....................... G03B 20/01; G03B 23/04
[52] U.S. Cl. ...................................... 40/361; 40/362; 40/366; 353/104
[58] Field of Search ................. 40/361, 362, 366, 367; 353/104, 114, 116, 103

[56] References Cited
U.S. PATENT DOCUMENTS 2,853,816 9/1958 Rogas ..................................... 40/367
3,419,982 1/1969 Heisler ................................. 353/104

FOREIGN PATENT DOCUMENTS 262653 6/1968 Austria ................................ 353/116
2658190 6/1978 Fed. Rep. of Germany ...... 353/103
1175862 1/1970 United Kingdom ................ 353/104

Primary Examiner—Gene Mancene
Assistant Examiner—James Hakomaki
Attorney, Agent, or Firm—Schwartz & Weinrieb

[57] ABSTRACT

A slide viewer or projector is provided with a device for preventing two or more slides from attempting to enter into the viewing or projecting area simultaneously. The device comprises a barrier with a wiper pivotally mounted thereon. The barrier and wiper are spaced apart from the path taken by a slide so that the slide pivots the wiper against the action of biasing means and then the barrier is raised into engagement with the upper surface of the slide and this allows the wiper to wipe over the upper surface of the slide to "kick off" any other slide resting on the surface.

5 Claims, 4 Drawing Figures

SLIDE VIEWER OR PROJECTOR

FIELD OF THE INVENTION

This invention relates to apparatus for viewing or projecting photographic transparencies, hereinafter referred to as "slides". In particular, the invention is concerned with slide viewing or projecting apparatus which has provision for displacing slides one at a time from a stack of slides to a viewing or projecting area.

With such viewers and projectors, there has up to now been a problem in feeding the slides one at a time from the stack to the viewing or projecting area. This problem is due to the tendency for more than one slide to be displaced simultaneously into the viewing or projecting area and this results in a blocking of the path leading to the viewing or projecting area.

Slides are not of a uniform thickness and it is difficult therefore to design a slide changer, whether it be manually or automatically operable, which accommodates one, and only one, slide at a time. Furthermore, slides become distorted and damaged after a period of use and, in such a condition, one slide may catch or grip a section of another slide and a slide which is displaced towards the viewing or projecting area may drag an adjacent slide with it. Even slides that are not distorted can exert a drag upon each other since they are not particularly smooth and this again creates the possibility of two slides attempting to enter into the viewing or projecting area simultaneously.

SUMMARY OF THE INVENTION

It is an object of the present invention to provide a slide viewer or projector having means by which this difficulty is overcome.

According to the present invention, a slide viewer or projector has a region for receiving a stack of slides and means providing a path extending from said region to a viewing or projecting area, a slide changer for displacing slides one at a time along said path from the region to said area, a barrier spaced from the path by a distance less than the thickness of the thinnest slide to be accommodated, a wiper pivotally mounted on the barrier and biased to a position in which a portion of the wiper is spaced from the path by a distance not less than the separation of the barrier from the path and is positioned between the barrier and the region, the action of a slide moving from said region to said area causing the wiper to be pivoted against the action of the biasing means until the barrier is raised on to the upper surface of the slide and the wiper then pivots back and wipes over the upper surface of the slide.

The action of the wiper wiping over the upper surface of the slide ensures that a second slide cannot be displaced with the first-mentioned slide due to the second slide being caught on the upper surface of the first-mentioned slide.

In a preferred arrangement, the wiper comprises a plate including a tip which is engageable by a slide moving along said path and the biasing means comprise a leaf spring engaging one edge of the plate. If desired, a pair of wipers each as described above may be employed.

BRIEF DESCRIPTION OF THE DRAWINGS

In order that the invention may be more readily understood it will now be described, by way of example only, with reference to the accompanying drawings, in which.

DETAILED DESCRIPTION OF THE PREFERRED EMBODIMENT

Figure 1:
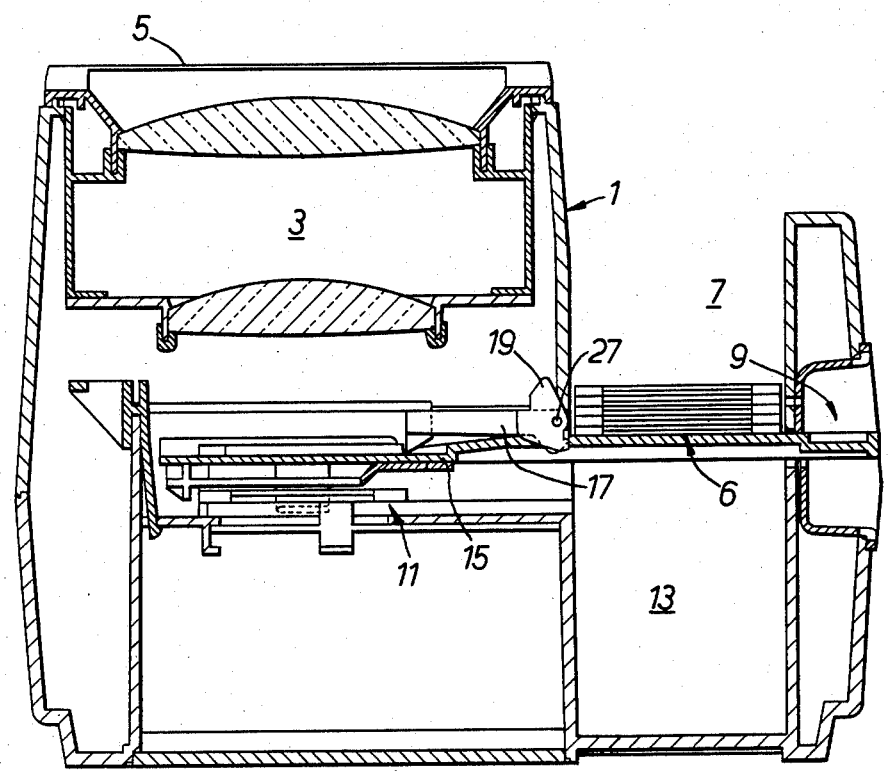
FIG. 1 is a sectional elevation of a slide viewer in accordance with one embodiment of the invention.

Referring now to FIG. 1, a slide viewer comprises a casing 1, conveniently of plastics material, supporting a lens structure 3 and a viewing screen 5. An electric lamp (not shown) is positioned in the casing 1 and the lamp is energised either from a number of electric batteries (not shown) or from a mains supply. Slides 6 to be viewed are arranged in a stack in a region 7 which is to one side of the lens structure. A semi-automatic slide changing device, indicated generally by reference 9, is provided for feeding the slides one at a time from the bottom of the stack into a viewing area 11 positioned between the lamp and the lens structure and for withdrawing the slides, after they have been viewed, from the viewing area to a second stacking area 13 which is beneath the region 7. The slide changing device includes a carrier platform 15 which provides a path from the stacking region 7 to the viewing area 11. The platform has an upstanding projection referred to as a pusher which, when the platform is moved to the right to its fullest extent, lies to the right of the lowest slide in the region 7. On moving the platform to the left to the position shown in FIG. 1, the pusher engages the lowest slide and pushes it into position above the viewing area. When the platform is next moved to the right, the slide is prevented from moving with it but the previously viewed slide is withdrawn from the viewing area to the area 13. The new slide then drops into the viewing area.

Between the region and the viewing area, and associated with the path therebetween, there is a barrier 17 which is spaced from the path by a distance less than the thickness of the thinnest slide to be accommodated. A wiper 19 is pivotally mounted on the barrier and the barrier and the wiper together serve to prevent any tendency for more than one slide to move at a time along the path into the viewing area. The construction of the barrier and wiper is shown in more detail in FIGS. 2, 3 and 4.

Figure 2:
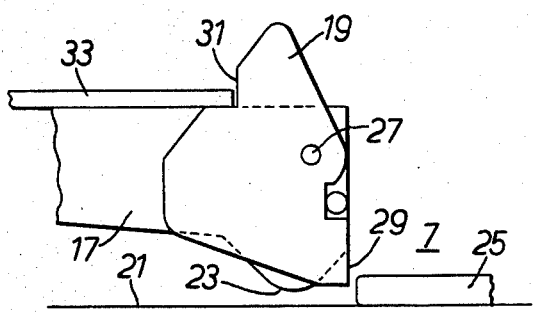
FIGS. 2, 3 and 4 are details of part of the slide viewer shown in FIG. 1 illustrating successive steps in the insertion of a slide into a viewing area.
Figure 3:
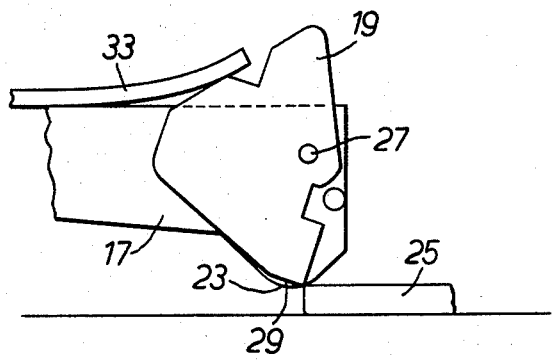
Figure 4:
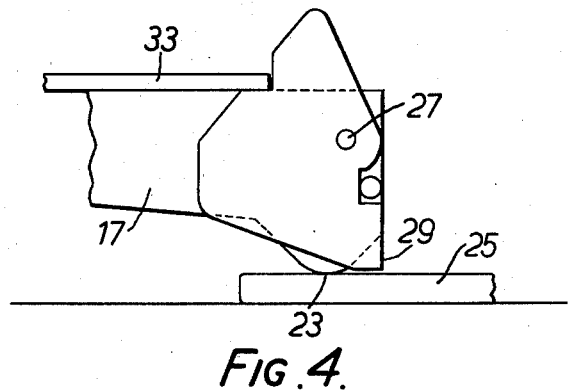

Referring to FIGS. 2, 3 and 4, it can be seen that the barrier comprises a member extending across the width of the path 21 with a bulged portion 23 of the barrier being spaced from the path 21 by a distance which is less than the thinnest slide 25 which is to be accommodated. The wiper 19 comprises a plate-like member pivoted at 27 to the barrier and having a tip 29 which is positioned between the bulge 23 and the region 7 and which is separated from the path 21 by a distance which is not less than the separation of the bulge 23 from the path 21 and which is such as to be encountered by a slide moving along the path 21. The wiper has a recessed portion 31 into which one end of a leaf spring 33 projects. This leaf spring provides a degree of biasing to the wiper and, in its stable position, the wiper is positioned relative to the barrier, as shown in FIG. 2.

When a slide 25 is moved by the slide changer from the stacking region 7 to the viewing region, it first encounters the tip 29 of the wiper causing the wiper to be pivoted against the action of the spring 33 to the position shown in FIG. 3. At this position, the lower end of the tip is in engagement with the upper surface of the slide 25 but the bulge 23 projects below the upper surface of the slide. Further movement of the slide towards the viewing area causes the slide to abut against the bulge 23 to lift the barrier sufficiently for the bulge to move along the upper surface of the slide. The tip of the wiper is then freed from contact with the upper surface of the slide and the leaf spring 33 causes the wiper to pivot in an anti-clockwise direction and the tip moves over the upper surface of the slide and, if a second slide resting on the upper surface of the lower slide is attempting to enter into the viewing area, then the wiping action of the wiper kicks the upper slide back into the stacking region 7. After the wiper has moved across the upper surface of the slide, it returns to its initial position, as shown in FIG. 4.

Although only one wiper has been described, it is convenient for a pair of wipers to be provided, each being in the form of a plate and each pivotally mounted at an opposite end of the barrier. Each wiper is engaged by a leaf spring to provide a bias for the wiper.

The leaf spring may be formed integral with the barrier 17.

Although a slide viewer has been described, a slide projector may also be provided with the barrier and wiper, as described above, to prevent more than one slide attempting to enter from a stack of slides into the projecting area.

I claim:

1. A slide viewer or projector having a region for receiving a stack of slides and means providing a path extending from said region to a viewing or projecting area, a slide changer for displacing slides one at a time along said path from the region to said than the thickness of the thinnest slide to be accommodated, a wiper pivotally mounted on the barrier and biased to a position in which a portion of the wiper is spaced from the path by a distance not less than the separation of the barrier from the path and is positioned between the barrier and the region, the action of a slide moving from said region to said area causing the wiper to be pivoted against the action of the biasing means until the barrier is raised on to the upper surface of the slide and the wiper then pivots back and wipes over the upper surface of the slide.

2. A slide viewer or projector as claimed in claim 1, in which the wiper comprises a plate including a tip which is engageable by a slide moving along said path and the biasing means comprises a leaf spring engaging one edge of the plate.

3. A slide viewer or projector as claimed in claim 1, in which the wiper comprises a pair of plates positioned one at each of the opposite ends of the barrier and each plate includes a tip which is engageable by a slide moving along said path and the biasing means comprises a pair of leaf springs engaging one edge of the respective plates.

4. A slide viewer or projector as claimed in claim 1 or 2, in which the slide changer is manually operable.

5. A slide viewer or projector as claimed in claim 1 or 2, in which the slide changer is motor driven.

* * * * *